(No Model.)

W. B. LEARNED.
WATCH MOVEMENT BOX.

No. 412,030. Patented Oct. 1, 1889.

WITNESSES.
H. Brown
A. D. Harrison

INVENTOR
W. B. Learned
by Wright Brown Quimby
Attys.

UNITED STATES PATENT OFFICE.

WILLIAM B. LEARNED, OF BOSTON, MASSACHUSETTS, ASSIGNOR OF ONE-HALF TO THE E. HOWARD WATCH AND CLOCK COMPANY, OF SAME PLACE.

WATCH-MOVEMENT BOX.

SPECIFICATION forming part of Letters Patent No. 412,030, dated October 1, 1889.

Application filed March 8, 1889. Serial No. 302,418. (No model.)

*To all whom it may concern:*

Be it known that I, WILLIAM B. LEARNED, of Boston, in the county of Suffolk and State of Massachusetts, have invented certain new and useful Improvements in Watch-Movement Boxes, of which the following is a specification.

This invention has for its object to provide a packing-box adapted to contain a watch-movement and to protect the same from the shocks and jars incidental to transportation. It is well known that trunks, boxes, or other packages in which watch-movements are shipped are necessarily subjected to shocks and jars during transportation; and it is also well known to those having experience in such matters that the fine and delicate journals of the arbors of watch-movements are often broken by such shocks and jars, even though the utmost care be taken in packing the movements.

My invention consists in a packing-box of suitable size to contain one movement, and provided with a series of yielding bearings or springs which are parts of a lining of flexible sheet metal bent or curved to extend entirely around the interior of the box and present four yielding bearings for the watch-movement or for the inner box in which the same is inclosed, said bearings absorbing shocks or jars from all sides of the packing-box, all of which I will now proceed to describe and claim.

Figure 1:
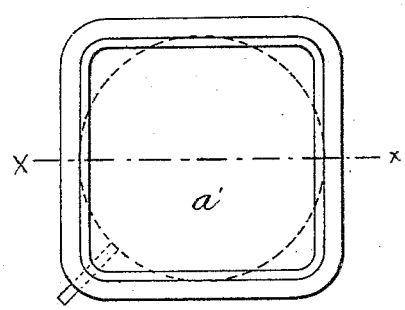
Figure 2:
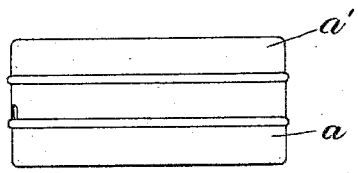
Figure 3:
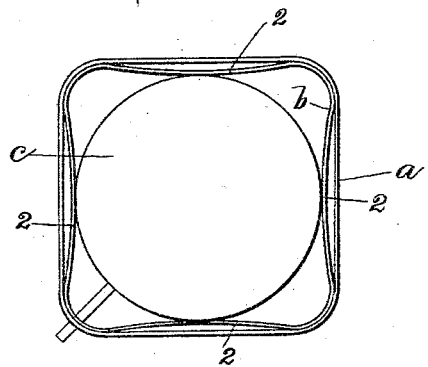
Figure 4:
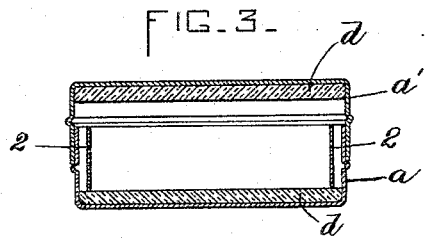

Of the accompanying drawings, forming a part of this specification, Figure 1 represents a top view of my improved box, showing by dotted lines a watch-movement therein. Fig. 2 represents a side view of said box. Fig. 3 represents a top view with the cover removed. Fig. 4 represents a section on line $x\,x$ of Fig. 1, the watch-movement being removed.

The same letters of reference indicate the same parts in all the accompanying figures.

Referring to Figs. 1 to 4, $a$ represents the body, and $a'$ the cover, of a sheet-metal box, the same being a rectangle with rounded corners, as shown in Figs. 1 and 3. Within the body of the box I place a lining $b$, consisting of a piece of sheet metal bent to closely fit the rounded corners of the box and to present four springs or bearings 2 2 2 2 between said corners, said springs or bearings projecting inwardly from the sides of the box and bearing with a yielding pressure against the inner box $c$, that contains the watch-movement.

It will be seen that the springs or bearings 2 2 2 2 are held in place by the close contact of the rounded corners of the lining $b$ on which they are formed with the rounded corners of the box and the friction attending such contact, so that no fastening of said lining to the box is required. The springs supporting the movement with a yielding pressure at four points protect it against shocks and jars from all sides.

$d\,d$ represent cushions of felt or other yielding material covering the inner surfaces of the bottom and cover of the box and serving to absorb shocks and jars directed against the top and bottom of the box $a$, the watch-movement or the inner box $c$ inclosing it being in contact with said cushions. It is obvious, however, that the spring-lining $b$ may be used without the cushions $d\,d$.

The box fitted with the spring-lining and cushions, as shown, is found to be a very efficient safeguard against damage to a watch-movement by the shocks and jars incidental to transportation. The form of the box and spring-lining, whereby the latter is sufficiently secured to the box by friction alone, makes the construction of the box as a whole simple and inexpensive.

I claim—

A watch-movement box having rounded corners, combined with a sheet-metal lining bent to fit said rounded corners and presenting inwardly-curved sides 2 between said corners, said sides constituting a series of springs or yielding bearings 2 2, which are separated by intervening spaces from the sides of the box, as set forth.

In testimony whereof I have signed my name to this specification, in the presence of two subscribing witnesses, this 2d day of March, A. D. 1889.

WILLIAM B. LEARNED.

Witnesses:
 C. F. BROWN,
 A. D. HARRISON.